United States Patent [19]

Kupper et al.

[11] Patent Number: 4,690,827
[45] Date of Patent: Sep. 1, 1987

[54] FRUIT JUICE CONTAINING DIET BEVERAGE

[75] Inventors: Philip L. Kupper, Cincinnati, Ohio; Katherine L. Moore, Brussels, Belgium; Robert L. Swaine, Jr., Springdale, Ohio

[73] Assignee: The Procter & Gamble Company, Cincinnati, Ohio

[21] Appl. No.: 760,885

[22] Filed: Jul. 31, 1985

[51] Int. Cl.$^4$ .......................... A23L 2/02; A23L 1/236
[52] U.S. Cl. ..................................... 426/548; 426/599
[58] Field of Search ..................... 426/599, 548, 330.5, 426/577, 578

[56] References Cited

U.S. PATENT DOCUMENTS

| 4,160,849 | 7/1979 | Huchette et al. | 426/599 |
| 4,388,330 | 6/1983 | Wabben | 426/330.5 |
| 4,433,000 | 2/1984 | De Leon et al. | 426/330.5 |
| 4,547,384 | 10/1985 | Kryger | 426/548 |

FOREIGN PATENT DOCUMENTS

| 0044747 | 1/1982 | European Pat. Off. | 426/599 |
| 0118034 | 9/1984 | European Pat. Off. | 426/599 |
| 216618 | 12/1984 | Fed. Rep. of Germany | 426/599 |

OTHER PUBLICATIONS

Nelson et al, 1980, Fruit and Vegetable Juice Processing Technology, AVI Publishing Co., Westport, Conn., p. 492.

*Primary Examiner*—Raymond N. Jones
*Assistant Examiner*—Carolyn Paden

[57] ABSTRACT

Artificially sweetened fruit juice containing beverages are disclosed. The beverages have an increased background pulp volume. This reduces the taste negatives of artificial sweeteners.

7 Claims, No Drawings

FRUIT JUICE CONTAINING DIET BEVERAGE

TECHNICAL FIELD

The present invention relates to low-calorie, fruit juice containing beverages. In particular, this invention relates to juice containing beverages comprising a so called artificial or non-nutritive sweetener having taste characteristics more faithfully mimicking those of nutritive sweetened beverages than was heretofore possible.

Fruit juice containing beverages are well known. Depending on the platform on which a particular beverage is sold and legislation pertaining to the minimum fruit juice content of a given type of beverage, such beverages may contain, for example, 10%, 25% or 50% fruit juice. The balance of these beverage compositions typically comprises water, and ingredients imparting a pleasant taste to the product. Almost invariably one of the taste imparting ingredients is a sweetener. Frequently, the sweetener is a natural, nutritive sweetener like sugar, honey, corn sweetener, or the like. More and more, however, non-nutritive artificial sweeteners are being used. A drawback of these artificial sweeteners is their taste profile characterized by an unpleasant lingering aftertaste, frequently described as "metallic" or "bitter".

It is, therefore, an object of the present invention to provide a fruit juice containing beverage comprising a non-nutritive sweetener and having a reduced unpleasant aftertaste.

SUMMARY OF THE INVENTION

The present invention relates to a beverage comprising fruit juice, water and a non-nutritive sweetener, characterized in that it has a background pulp level which is at least 20%, preferably at least 70%, greater than the background pulp level that would be obtained by low shear mixing of the ingredients.

DETAILED DESCRIPTION OF THE INVENTION

The beverage compositions of the present invention comprise fruit juice, water and an artificial or non-nutritive sweetener, and have an increased background pulp volume.

The fruit juice component of the beverage can be any type of fruit juice. Examples include juice of orange, pear, apple, grapefruit, apricot, grape lemon and mixtures thereof. Pulp-containing juices, like orange, grapefruit, pear, apricot, and their mixtures are preferred for use herein. Suitable are also so called reconstituted juices, that is, juices which have been concentrated by evaporating a significant amount of their water content, and subsequently diluted to their ususal strength through the addition of water.

The beverages herein typically contain from 5% to 100% fruit juice, preferable from 10% to 65%.

The second major component is added water, i.e. water that is added to the composition in addition to the water contained in the fruit juice component. The amount of water ranges from 0% to slightly less than 95%.

Non-nutritive sweeteners are known substances having a sweet taste but a caloric value one or more orders of magnitude lower than that of sucrose. The low caloric value stems, for example, from an inability of the human digestive system to metabolize or resorb the sweetener. Other sweeteners are wholly or partially metabolized and/or resorbed by humans, but their sweetness intensity is one or more orders of magnitude higher than that of sucrose. Hence, they are not "non-nutritive" in the strict sense of the word, but such minute quantities are needed for the desired taste effect that their contribution to the caloric content of the diet beverage is very small. This is why these compounds have come to be referred to as non-nutritive, and they will be so referred to herein.

Examples of such non-nutritive sweeteners are disclosed in Kirk-Othmer, "Encyclopedia of Chemical Technology", third edition Vol. 22, pp 448–464, the disclosures of which are incorporated herein by reference.

Examples of non-nutritive sweeteners include cyclamate, saccharin and aspartame. Mixtures of non-nutritive sweeteners can also be used, as well as combinations of non-nutritive, artificial sweeteners and nutritive, natural sweeteners (beet sugar, for example). Typically, the amount of non-nutritive sweetener will be in the range of 0.1 to 1 g/l, dependent on the sweetness intensity of the non-nutritive sweetener, the presence or absence of a nutritive sweetener, and the desired level of sweetness of the beverage. The choice of the non-nutritive sweetener(s) and their level(s) is within the realm of skills of the formulator and is not an essential element of the present invention.

The fruit juice component of the beverages herein typically contains a certain amount of fruit pulp. A portion of this fruit pulp is of such a small particle size that it normally remains dispersed in the beverage. The volume of this pulp fraction, referred to herein as the Background Pulp Volume, is determined by a centrifuge test method. The test method is disclosed in "Citrus Science & Technology", Vol. 2 (1977) at page 509 and described in some detail herein below under "Test Method". The background pulp volume of a fruit juice containing beverage is determined by the amount and the kind of fruit juice that is present in the beverage. For example, orange juice reconstituted from frozen concentrated orange juice (FCOJ) has a background pulp volume of up to 10%. A beverage comprising WO % by weight orange juice contains up to $0.1 \times WO$ % background pulp. Similarly, apricot juice reconstituted from apricot puree contains, depending on the source, from 70% to 90% background pulp. A beverage comprising VA % apricot juice contains from $0.7 \times WA$ % to $0.9 \times WA$ % background pulp.

The beverage of the present invention has a background pulp volume, V, that is at least 20%, preferably at least 70%, greater than the background pulp volume that would be obtained by low shear mixing of the ingredients. The latter background pulp volume will be referred to as native volume, or NV. Hence, the beverage of the present invention is characterized by $$V \geq 1.2 \times NV;$$

and preferably $$V \geq 1.7 \times NV$$

In the case of the orange juice beverage examplified above:

$$V \geq 1.2 \times (0.1 \times WO)$$

preferably $$V \geqq 1.7 \times (0.1 \times WO).$$

Similarly, for a beverage containing WO % orange juice and WA % apricot juice:

$$V \geqq 1.2 \times (0.1 \times WO + 0.9 \times WA)$$

preferably $$V \geqq 1.7 \times (0.1 \times WO + 0.9 \times WA)$$

The increased background pulp volume can be obtained by adding to the beverage composition the required amount of a particulate cellulose or pectin/cellulose food additive. The term denotes materials of vegetable origin consisting essentially of cellulose and/or pectin materials. Examples of sources of such materials are wood, cereal bran and fruit pulp, fruit pulp being particularly preferred. The particle size of the particulate food additive should be such that the particles pass through a 20 mesh sieve, but settle when subjected to centrifugal forces applied in the test of background pulp volume determination. Hence, the required particle size for a given particulate food additive can be readily established by simple experiments.

Food-grade cellulose of the required particle size is commercially available as microcrystalline cellulose—for example AVICEL TM. The material is described in some detail in U.S. Pat. No. 3,022,104 (1962, Battista).

The citrus peel based food additives disclosed in U.S. Pat. No. 4,379,782 (1903, Staub et al) are suitable for use in the present beverages. The pectin-containing absorbent material disclosed in European Patent Application No. 0 137 611, published Apr. 17, 1985 are also suitable for use in the beverages of the present invention.

In a preferred embodiment of the invention the additional background pulp is homogenized fruit pulp. Homogenization is a process by which a fluid is pumped through one or more restrictions. The restrictions are dimensioned in a way that high pressures are necessary to force the fluid through the restrictions. Typically, the restictions are adjustable or spring-seated valves. Homogenization is described in Kirk-Othmer, "Encyclopedia of Chemical Technology", third edition, at Vol. 8, pp 921–923 (emulsification) and at Vol 15, pp 528–530 (homogenization of milk).

When a slurry of fruit pulp is passed through a homogenizer operated at a high pressure, the average size of the pulp particles is markedly reduced. Fruit pulp typically comprises small particle size background pulp and the so called sensible pulp which has a larger particle size.

Homogenization converts the sensible pulp to background pulp. The homogenized pulp can be used in the present fruit juice containing beverages to adjust the background pulp volume, V.

In its process aspect, the present invention provides a process for making a fruit juice containing diet beverage characterized in that it comprises a background pulp-increasing step by which the volume of background pulp is increased by at least 20% preferably at least 70%.

This process step may comprise the addition of a particulate cellulose or pectin/cellulose food additive of the type discussed hereinabove. Particularly preferred is the addition of homogenized fruit pulp. The background pulp increasing step may also comprise subjecting the fruit pulp component of the beverage to a particle size reduction step. Such a particle size reduction step can be, for example, one or more passes through a homogenizer, provided that the homogenizer is operated at a pressure of at least 190 bar (190 MPa). It is possible to homogenize the entire beverage formulation after mixing of the ingredients has been completed, or to homogenize the fruit juice component prior to addition of the other ingredients, or, for example, after the addition of water but prior to the addition of the remaining ingredients.

TEST METHOD

The background pulp volume of a fruit juice or a fruit juice containing beverage is determined as follows A sample of the beverage is stirred, then strained through a 20 mesh (850 micrometer) sieve. A 50 ml graduated conical tube is filled with strained beverage. The tube is placed in a centrifuge such that the graduated scale faces the direction of rotation. The sample is centrifuged at the required speed for 10 minutes. The centrifuge speed, S, for a centrifuge having diameter, d, is calculated as follows:

$$S = \text{Square Root } (25.4)/d \times 1609 \text{ RPM}$$

d is the measured distance between two opposing centrifuge tubes (in cm).

The pulp volume is read from the graduations on the tube. The reading multiplied by two will give the background pulp volume, V.

EXAMPLE I

An orange juice nectar is prepared from orange juice concentrate, with essence and oil added in usual fashion. One batch is sweetened with sodium saccharin (0.16 g per kg). A second batch is sweetened with aspartame (0.20 g per kg). Orange pulp is homogenized by a single pass through a homogenizer operated at 540 bar (54 MPa). Homogenized pulp is added to each batch of artificially sweetened orange juice, 60 g per kg.

EXAMPLE II

A diet orange/apricot nectar is prepared as follows. The following ingredients are blended to a concentrate blend mix:

| orange concentrate | 65 °Brix | 35.39 kg |
| --- | --- | --- |
| " | 65.7 °Brix | 8.98 kg |
| apricot puree | 12.55 °Brix | 191.87 kg |
| Na—cyclamate | | 0.496 kg |
| Na—saccharin | | 0.024 kg |
| ascorbic acid | | 0.18 kg | and adjusted to 17.7 °Brix. The concentrate mix is cooled to a temperature between 0° C. and 6° C.

The mix is homogenized in a two stage homogenizer (Alfa-Laval SHL 25), the first stage at 250 bar (25 MPa), the second stage at 50 bar (5 MPa); volume rate 6500 l/hr. The homogenization results in a temperature increase of about 7° C. The mix is cooled again, to 2°–7° C., and diluted to target °Brix (5.5°). The beverge has background pulp volume 30%. Non homogenized control: 16%.

In an alternate process, the concentrate blend is diluted to 5.5 °Brix, then homogenized at 250/50 bar. The increase in temperature is 4° C. Background pulp volume is 20%.

What is claimed:

1. A process for preparing an artificially sweetened orange juice containing beverage with reduced artificial sweetener unpleasant aftertaste, said process comprising the steps of forming an admixture comprising from about 5% to about 100% orange juice, from 0 to about 95% water, a sweetening amount of an artificial sweetener, and an amount of fruit pulp to provide in the orange juice containing beverage, upon particle size reduction of the pulp, a percentage background pulp volume at least twenty percent higher than that of said original orange juice, reducing the fruit pulp to a particle size such that the particles pass through a 20 mesh sieve whereby said pulp reduces unpleasant aftertaste caused by said artificial sweetener.

2. A process as recited in claim 1, wherein said reducing step is carried out on the fruit pulp prior to formation of said admixture.

3. A process as recited in claim 1, wherein said reducing step is carried out on the fruit pulp after formation of said admixture.

4. A process as recited in claims 2 or 3, wherein said reducing step is carried out by subjecting the fruit pulp to at least one pass through a homogenizer operated at a pressure of at least 190 bar.

5. A process as recited in claims 2 or 3, wherein said reducing step is carried out by subjecting the fruit pulp to at least one pass through a homogenizer operated at a pressure of from 200 bar to 600 bar.

6. A process as recited in claim 1, wherein orange juice constitutes from about 5% to about 95% of said admixture.

7. A process as recited in claim 1, wherein said fruit pulp comprises added fruit pulp.

* * * * *